United States Patent [19]
Kronowitt

[11] Patent Number: 5,819,773
[45] Date of Patent: Oct. 13, 1998

[54] WATER STORAGE TANK

[76] Inventor: Robert Kronowitt, 3310 Southwest 2nd St., Deerfield Beach, Fla. 33442

[21] Appl. No.: 554,477

[22] Filed: Nov. 7, 1995

[51] Int. Cl.⁶ .................................................. F16K 37/00
[52] U.S. Cl. .............................. 137/1; 137/343; 137/357; 137/559
[58] Field of Search ..................... 137/559, 357, 137/343, 1

[56] References Cited

U.S. PATENT DOCUMENTS

| | | | |
|---|---|---|---|
| D. 353,436 | 12/1994 | Hess | 137/592 |
| 1,705,845 | 3/1929 | Woodman | 137/559 |
| 2,206,089 | 7/1940 | Gray | 137/559 |
| 2,931,382 | 4/1960 | Cirillo | 137/357 |
| 3,030,774 | 4/1962 | Arenhold | 137/559 |
| 3,095,893 | 7/1963 | Martin | 137/216 |
| 4,718,452 | 1/1988 | Maitland | 137/592 |
| 4,962,789 | 10/1990 | Benscoter | 137/571 |

*Primary Examiner*—A. Michael Chambers
*Attorney, Agent, or Firm*—Malin, Halev, DiMaggio & Crosby, PA

[57] ABSTRACT

An insulated water storage tank preferably constructed from a rigid or hard plastic is disclosed which, in conjunction with associated piping and a series of valves, is directly connected to a dwelling's regular water supply line. The storage tank is filled with the regular the water supply line by opening an access or fill valve and closing a supply or intake valve. When the tank is filled the fill valve is also closed and waters travels normally through the supply line bypassing the storage tank. In the event of an interruption of the regular water supply, for whatever reason, a shut-off valve, which is normally opened, is closed preventing water flow from the main water supply and the supply valve is opened to allow the water stored in the tank to enter into the water supply line, thus providing an auxiliary supply of water.

19 Claims, 5 Drawing Sheets

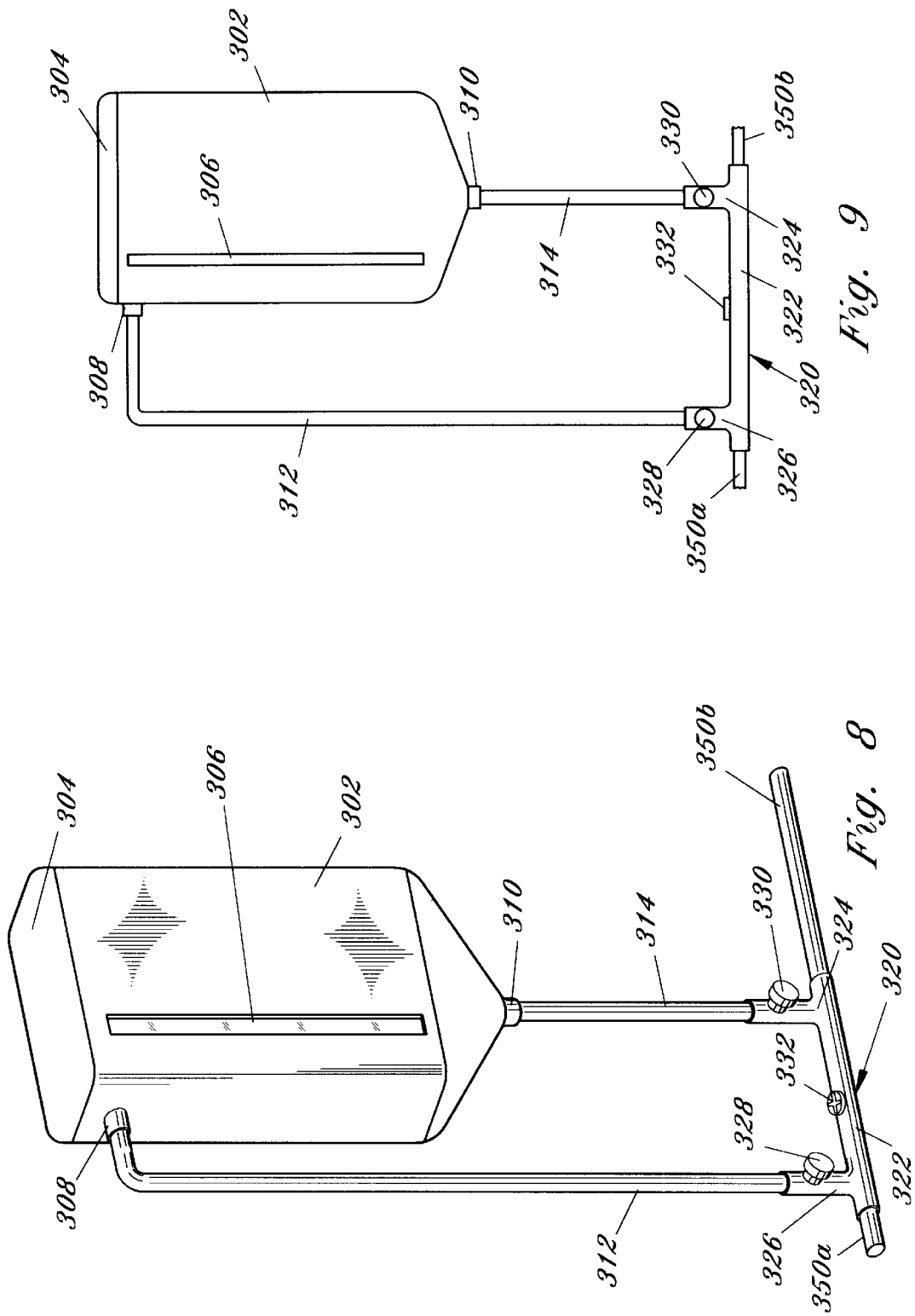

WATER STORAGE TANK

BACKGROUND OF THE INVENTION

1. Field of the Invention

The present invention relates generally to water storage, and more particularly, to a water storage tank which directly communicates with a conventional water supply line and is preferably used in emergency situations.

2. Description of the Prior Art

Approximately one-third of all United States residents are located in areas prone to natural disasters, such as floods, earthquakes, hurricanes, and a myriad of other situations that can and do interrupt normal water supply to such residents. Typically, when a natural disaster is expected, the affected residents normally overwhelm retail stores to purchase the basic needs in the event of an interruption of municipal services. One of the main basic supplies purchased is water, which is usually purchased in gallon containers, primarily for drinking purposes. The water purchased in gallon containers is primarily used for drinking purposes and, according to supermarket figures, these purchases are typically for ten gallons or less of water. Ten gallons of water is a sufficient amount to supply a normal family with drinking water for three to five days. Additionally, water for flushing toilets and washing is usually stored by filling bathtubs. Thus, the distribution and usage of such water supplies in the home is cumbersome and often inadequate. Some attempts in the prior art include U.S. Pat. Nos. 4,962,789; 4,718,452; 3,095,893; and 2,931,382.

U.S. Pat. No. 4,962,789, issued to Benscoter, discloses an emergency fresh water reservoir which is connected between a municipal water supply line and a hot water heater for a building. Circulation of fresh water is assured and stagnancy of water is prevented during normal operation of a municipal water supply due to flow through emergency water reservoir to replenish water in the hot water heater, as hot water is utilized in the building.

U.S. Pat. No. 3,095,893, issued to Martin, discloses a water storage tank system for use in buildings which is interposed between the water supply conduit and the plumbing facilities to automatically insure the maintenance of fresh water in all the tanks at all times.

U.S. Pat. No. 4,718,452, issued to Maitland, discloses an emergency portable water storage system which includes a generally cylindrical water tank seated on a base member, with the tank having opposite dome-shaped portions. A garden hose is coupled to the outlet fitting for continuous replenishment of the supply water during use of the garden hose for normal tanks such as watering plants and shrubs.

U.S. Pat. No. 2,931,382 discloses a water tank wherein water from a service entrance to a water distribution system of a building flows through the storage tank. In the event of cutoff of water supply, the tank is full of water for emergency use.

The prior art fails to disclose a water storage tank which can be directly in connection and utilized with the existing main water supply line. Furthermore, the prior art devices require constant maintenance due to ongoing use of the tank and require the user to tap the water out of the bottom of the tank into a separate container and then carry the container to the desired location. It is therefore, to the effective resolution of the aforementioned problems and shortcomings of the prior art that the present invention is directed.

SUMMARY OF THE INVENTION

The present invention discloses a gravity-based water storage system that allows for continued use of existing faucets and toilets during any interruption of the normal water supply due to natural disasters or temporary interruptions, such as repairs or construction. The storage tank is preferably constructed from a rigid plastic and is either rectangular or cylindrical in shape, with a funnel bottom member. The storage tank can be constructed from other materials including metal, steel, porcelain, glass, etc. The storage tank can be hung on any interior or exterior wall above standard faucet height.

The storage tank is directly connected to the normal water supply system and is controlled by a series of valves. Preferably, the tank is filled only when a need for an emergency supply of water is deemed necessary, such as a hurricane, tornado, storm, or flood warning. However, in locations which are prone to earthquakes, the storage tank may be kept filled at all times due to the uncertainty of when an earthquake will strike. When it is desired to use the water stored in the storage tank, a shut-off valve is provided to prevent water flow from the main water supply and an intake valve is opened allowing the water stored in the tank to be directed into the main line. Thus, the user is provided with fresh water which was collected and stored in the tank, prior to the contamination or potential contamination of the main water supply due to some occurrence, i.e. natural disaster, oil or chemical spill, tampering, pollutants, etc.

The present invention allows a home owner to easily store his or her own municipally supplied water at a fraction of the cost and to maintain a relatively normal water distribution within the home through existing piping and faucets, during an emergency situation where a normal water supply is interrupted.

It is an object of the present invention to provide a water storage tank which is directly connected to and fluidly communicates with the regular water supply system of a dwelling but which can be bypassed when not in use, such as during non-emergency periods.

It is another object of the present invention to provide a water storage tank which allows a gravity-fed water supply to each of the existing faucets and commodes in the dwelling associated with the water supply through the regular water supply system of a dwelling.

In accordance with these and other objects which will become apparent hereinafter, the instant invention will now be described with particular reference to the accompanying drawings.

BRIEF DESCRIPTION OF THE DRAWINGS

The invention may be better understood by reference to the drawings in which:

FIG. 8 is a front perspective view of an alternative embodiment of the present invention; and FIG. 9 is a front elevational view of the invention shown in FIG. 8.

DESCRIPTION OF THE PREFERRED EMBODIMENTS

Figure 2:
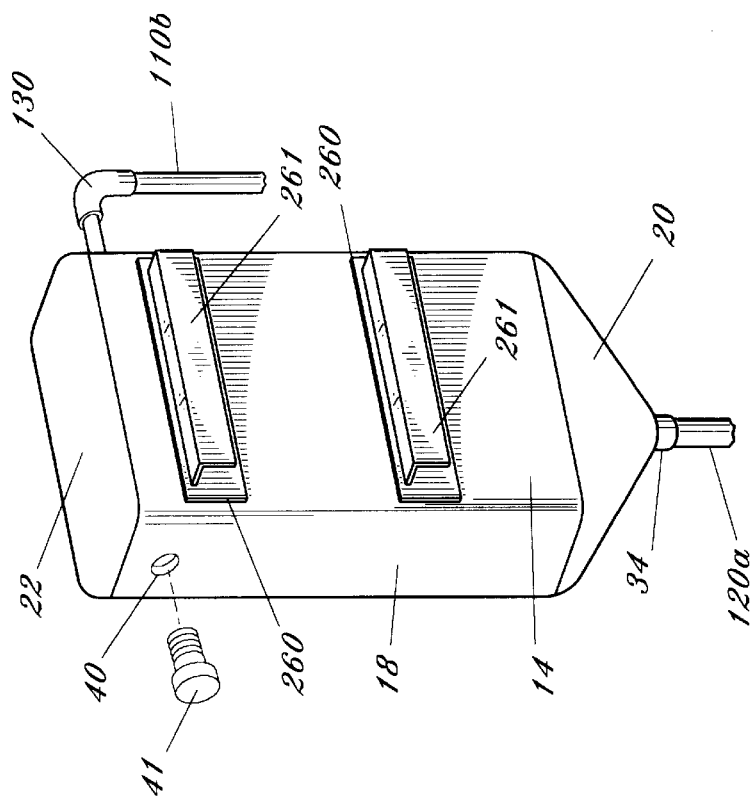
FIG. 2 is a back perspective view of the present invention.
Figure 1:
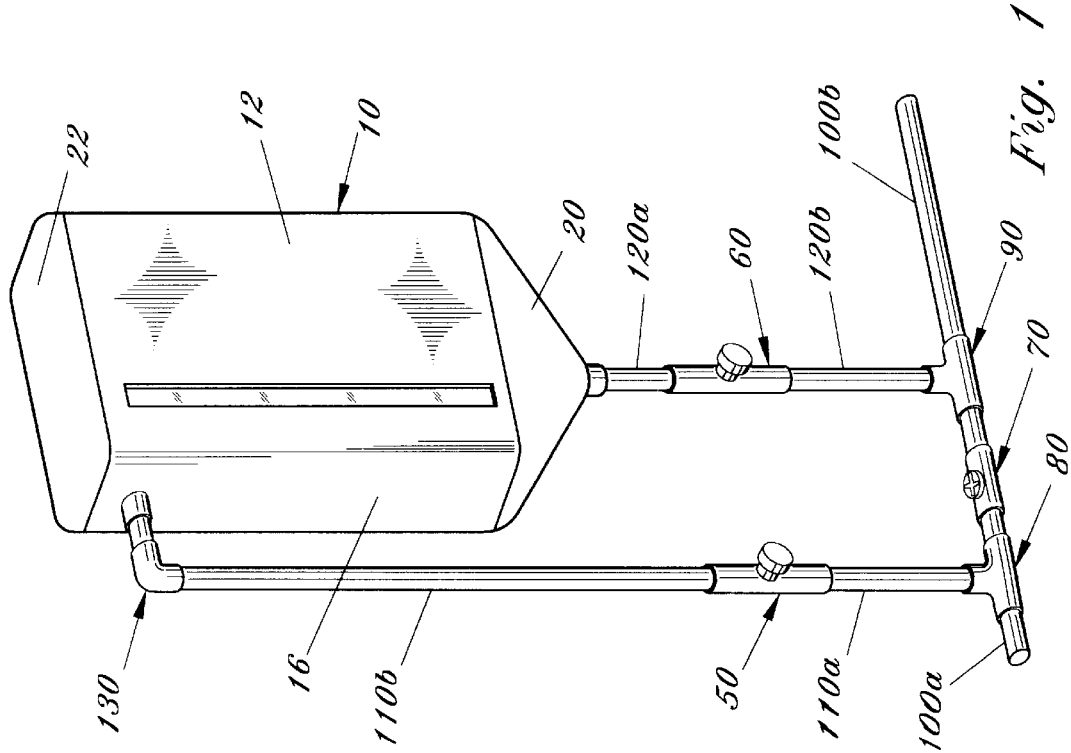
FIG. 1 is a front perspective view of the present invention.
Figure 4:
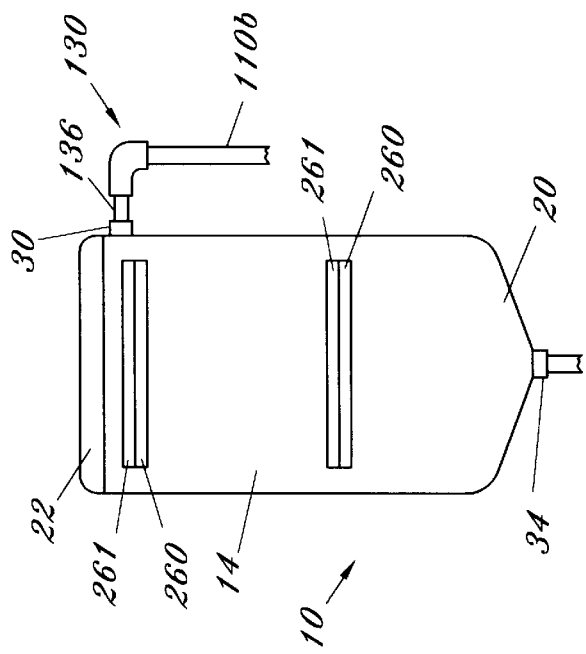
FIG. 4 is a back elevational view of the present invention.
Figure 3:
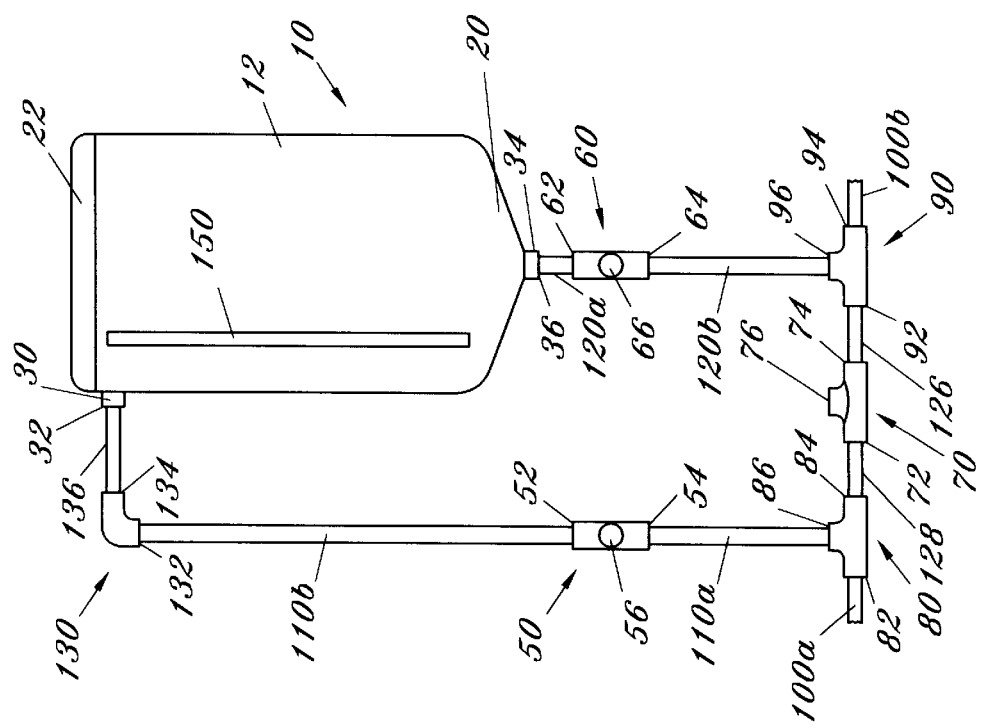
FIG. 3 is a front elevational view of the present invention.
Figure 6:
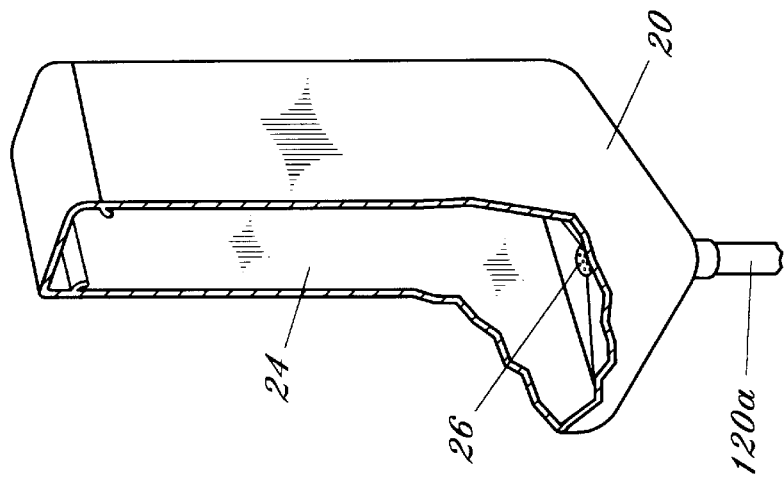
FIG. 6 is a cut away view illustrating the interior of the storage tank of the present invention.
Figure 5:
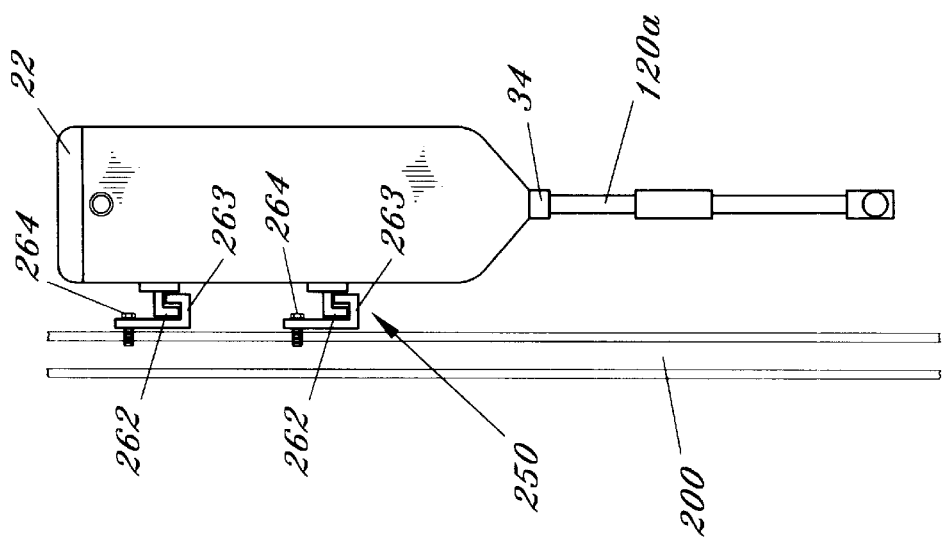
FIG. 5 is a side elevational view of the present invention.

As seen in the drawings, the present invention provides a storage tank generally designated at 10, which includes a front wall 12, back wall 14, first side wall 16, and second side wall 18. Preferably, walls 12, 14, 16 and 18 are constructed integral with each other. Tank 10 is, preferably, substantially rectangular in shape, however, such is not limiting and other shapes, such as cylindrical, may be provided for tank 10. Tank 10 includes a funnel-shaped bottom member 20 and can have an open top end. An opening 26 can be disposed at the bottom of funnel member 20. Funnel member 20 is, preferably, constructed integral with walls 12, 14, 16 and 18. Bottom member 20 is preferably funnel-shaped to create more pressure at the bottom of storage area 24 when forcing water through opening 26 by causing maximum gravity pressure on pipe 120*a*.

A lid or cover 22 is provided and snugly fits over the top end of tank 10. Cover 22 is preferably designed to clip on to tank 10 by means of a conventional semi-flexible lip. However, other conventional attachment designs are available and are considered within the scope of the invention. Thus, access to a water storage area 24 of tank 10 is provided by removing lid 22. As access to water storage area 24 is not essential to the operation of the present invention, lid 22 can be constructed integral with walls 12, 14, 16 and 20 and, thus, unremovable. However, lid 22 is preferably removable, to allow the inside of tank 10 to be cleaned from time to time.

A first fitting 30 can be disposed within an opening (not shown) in side wall 16 to provide access through side wall 16 to water storage area 24 of tank 10. Preferably, fitting 30 and its associated opening are disposed at or near the top end of side wall 16. A second fitting 34 is disposed within opening 26 for providing an escape route for water stored within water storage area 24, discussed in detail below. Preferably, fitting 34 and opening 26 are disposed at the bottom most point of funnel member 20.

In the preferred embodiment, tank 10 communicates with water supply line 7 through a series of valves 50, 60, and 70, joints 80, 90 and 130 and associated piping 110, 120, 126, 128 and 136. The tank 10 is connected to water supply line 100 which is normally utilized for supply water to the various faucets, toilets, bathtubs/showers in the dwelling. Access valve 50 has a first open end 52, a second open end 54 and a knob member 56. Intake valve 60 includes a first open end 62, a second open end 64 and a knob member 66. Similarly, shut-off valve 70 includes a first open end 72, a second open end 74 and a knob member 76.

T-joint 80 includes a first open end 82, a second open end 84 and third open end 86 disposed perpendicular to first and second ends 82 and 84, respectively. T-joint 90 includes a first open end 92, a second open end 94 and third open end 96 disposed perpendicular to first and second ends 92 and 94, respectively. Elbow-joint 130 includes a first open end 132 and a second open end 134. Ends 134 are perpendicularly disposed from each other.

Preferably, valves 50, 60 and 70 are conventional valves commonly used in plumbing system. Likewise, t-joints 80 and 90, and elbow-joint 130, are also conventional joints commonly used in plumbing system, and are typically constructed from PVC plastic, copper, steel, cast iron or other types of metals and plastics. The type of material selected for joints 80, 90 and 130 should be consistent or the same as the material of piping 100, 110, 120, 126, 128 and 136 which is also normally one of the above-mentioned materials. Furthermore, the material the various piping is constructed from should also be consistent, and is preferably, selected to match the material of the regular water supply line 100.

Piping 100, 110, 120, 126, 128 and 136, joints 80, 90 and 130, valves 50, 60 and 70, and fittings 30 and 34 all define water passageways extending therethrough from their respective first ends to their respective second ends. With respect to t-joints 80 and 90, water passageways are additionally defined through their respective third ends 86 and 96.

Pipe 136 is attached at its first end to exposed end 32 of fitting 30 and is attached at its second end to end 134 of elbow-joint 130. Pipe 110*b* is attached at its first end to end 132 of elbow-joint 130 and is attached at its second end to end 52 of access valve 50. Pipe 110*a* is attached at its first end to end 54 of access valve 50 and is attached at its second end to perpendicular end 86 of t-joint 80. Pipe 120*a* is attached at its first end to exposed end 36 of fitting 34 and is attached at its second end to end 62 of intake valve 60. Pipe 120*b* is attached at its first end to end 64 of intake valve 60 and is attached at its second end to perpendicular end 96 of t-joint 90. Pipe 126 is attached at its first end to end 92 of t-joint 90 and is attached at its second end to end 74 of shut-off valve 70. Pipe 128 is attached at its first end to end 72 of shut-off valve 70 and is attached at its second end to end 84 of t-joint 80. Thus, t-joints 80 and 90 intersect main or regular water supply line 100.

Prior to connecting tank 10 and its associated valves, joints, and piping, the main water supply for the dwelling should be turned off. Water supply line 100 is then cut by conventional means, i.e. hacksaw, pipe cutter, etc., to define first water supply line 100*a* and second water supply line 100*b*. The exposed first end of water supply line 100*b* is attached to end 94 of t-joint 90 while the remaining portion of water supply line 100*b* remains unaffected. Similarly, the first end of water supply line 100*a* is attached to end 82 of t-joint 80 while the remaining portion of the water supply line 100*a* remains unaffected.

Pipes 100, 110, 120, 126, 128 and 136 are preferably permanently attached as described above by conventional means, commonly utilized in the plumbing industry, such as glues, cements, tapes, solder, welding, etc.

Once tank 10 is properly connected as described above, during normal operation (non-emergency situations), tank 10 is preferably empty, valves 50 and 60 are in their closed positions, and valve 70 is in its open position. In this situation, water flows through pipe 110*a*, t-joint 80, pipe 128, valve 70, pipe 126, t-joint 90 and pipe 100*b* to their desired location i.e. kitchen faucet, bathtub/shower, toilet, etc. In this situation, the water flows similarly as if no storage tank is connected to the water supply line.

Preferably, t-joints 80 and 90 are provided for intersecting regular water line 100 with lines 110 and 120 which provide fluid communication to and from tank 10, respectively. In an alternative embodiment, in lieu of t-joint 80 and/or t-joint 90, self-taping valves (not shown) may be provided. The valves are attached to the desired location on water line 100 by a clamp member associated with a plurality of screws for tightening the valve on pipe 100. The valve includes a puncturing member in which by turning the valve the puncturing member pierces or punctures through the pipe to create an opening through the pipe. The valve may also be provided with a rubber member for sealing the pipe opening and valve attachment point. Once the valve is properly attached and the pipe opening formed, access pipe member 110*a* is attached to the first self-taping valve similar to its attachment at end 86 of t-joint 80 and intake pipe member 120*b* is attached to the second self-taping valve similar to its attachment at end 96 of t-joint 90. Furthermore, with the use of the self-taping valves, a portion of pipe 110 is still required to be removed for the attachment of shut-off valve 70. However, in this embodiment, pipes 126 and 128 are eliminated, and the open end of pipe 100a is attached to end 72 of valve 70 and the open end of pipe 100b is attached to end 74 of valve 70.

Accordingly, either t-joints 80 and 90 or the self-taping valves intersect water supply line 100. For purposes of discussion regarding the operation of the invention only t-joints 80 and 90 will be referred to. However, it should be understood that where t-joints 80 and 90 are mentioned below, the present invention can operate similarly with the substitution of the self-taping valves in lieu of the t-joints 80 and 90.

When storage tank 10 is not utilized (preferably in non-emergency situations), access valve 50 and intake valve 60 are in their respective closed positions. Additionally, a shutoff valve 70 is in its open position. Thus, as described above, fluids, such as water, flow through pipe 100a, t-joint 80, pipe 128, valve 70, pipe 126, t-joint 90, and pipe 100b and bypass tank 10. When it is recommended or required to store extra water (i.e. hurricane or tornado warnings, other potential contamination of the water supply may occur, etc.), access valve 50 is opened by turning knob 56 and storage tank 10 is filled via the pressure from water supply line 100. The pressure from water supply line 100 causes the water to travel from pipe 100a, into end 82 of t-joint 80 and out of end 86 of t-joint 80 through pipe 110a, valve 50, pipe 110b, elbow-joint 130, pipe 136, fitting 30 and into water storage area 24. While tank 10 is being filled, intake valve 60 remains in its closed position and shutoff valve 70 remains open. Once tank 10 is filled, access valve 50 is returned to its closed position by turning knob 56 in an opposite direction, and water once again flows as described above, bypassing tank 10.

Where the water coming from water supply line 100a is not to be used, possibly due to potential contamination, the user merely closes shut-off valve 70 by turning knob 76 and opens intake valve 60 by turning knob 66. Valve 50 remains in its closed position. Accordingly, valve 50 is only opened when filling tank 10 and valve 60 is only opened when emptying tank 10. When emptying tank 10, by forces of gravity, water stored in tank storage area 24 is supplied from area 24 through fitting 34, pipe 120a, valve 60, and pipe 120b, into end 96 of t-joint 90 and out of end 94 of t-joint 90 to water supply line 100b, for whatever desired use, i.e. faucets, commodes, bathtubs, showers, etc. Preferably, the water is stored within tank area 24 prior to any indication that water entering into the dwelling may be contaminated. Thus, when a contamination warning is given, the user has relatively large amount of water stored for use, that he or she knows is free from the fear of contaminations. Additionally, the stored water is directly tied into the users normal water supply line, causing minimal, if any, inconvenience to the user when utilizing the stored water.

Tank 10 can be provided with a transparent or clear stored water level indicating means. In one embodiment, the indicating means can consist of a clear, vertical plastic strip 150 which is integrally disposed within front wall 12 of tank 10. However, other materials may be utilized for strip 150, such as glass, and are within the scope of the present invention. Thus, when filing tank 10, the user can readily determine the level of water to avoid overfilling tank 10. Strip 150 also allows the user to maintain a visual track of usage, to carefully monitor how much fresh water is available in the event of a prolong water shortage. Preferably, strip 150 is disposed in front wall 12, however, strip 150 may be disposed in any of the walls of tank 10 and such other locations are within the scope of the invention.

Tank 10 can be sized to hold any amount of water, and is not limited to any particular amount of water storage. However, preferably, tank 10 should at least be able to hold 30 gallons of water to provide for an adequate supply of water over several days. Furthermore, tank 10 can be constructed from various conventional materials such as plastic, fiberglass, glass, porcelain, metal, etc. Preferably, tank 10 is constructed from rigid plastic.

As seen in FIG. 2, side wall 18 may be provided with a threaded aperture 40, wherein access is provided to water storage area 24 of tank 10, independent of removable cover 22, for the insertion of conventional purification (iodine) tablets to further insure the sterility of the water stored within. A screw-in cap 41 is provided for mating with threaded aperture 40. To insert one or more purification tablets (not shown), the cap is removed by unscrewing and the tablet is inserted through aperture 40 into the stored water. After the desired amount of tablets have been inserted, cap 41 is properly positioned within aperture 40 for sealing tank 10 and preventing debris from entering water storage area 24.

Figure 7:
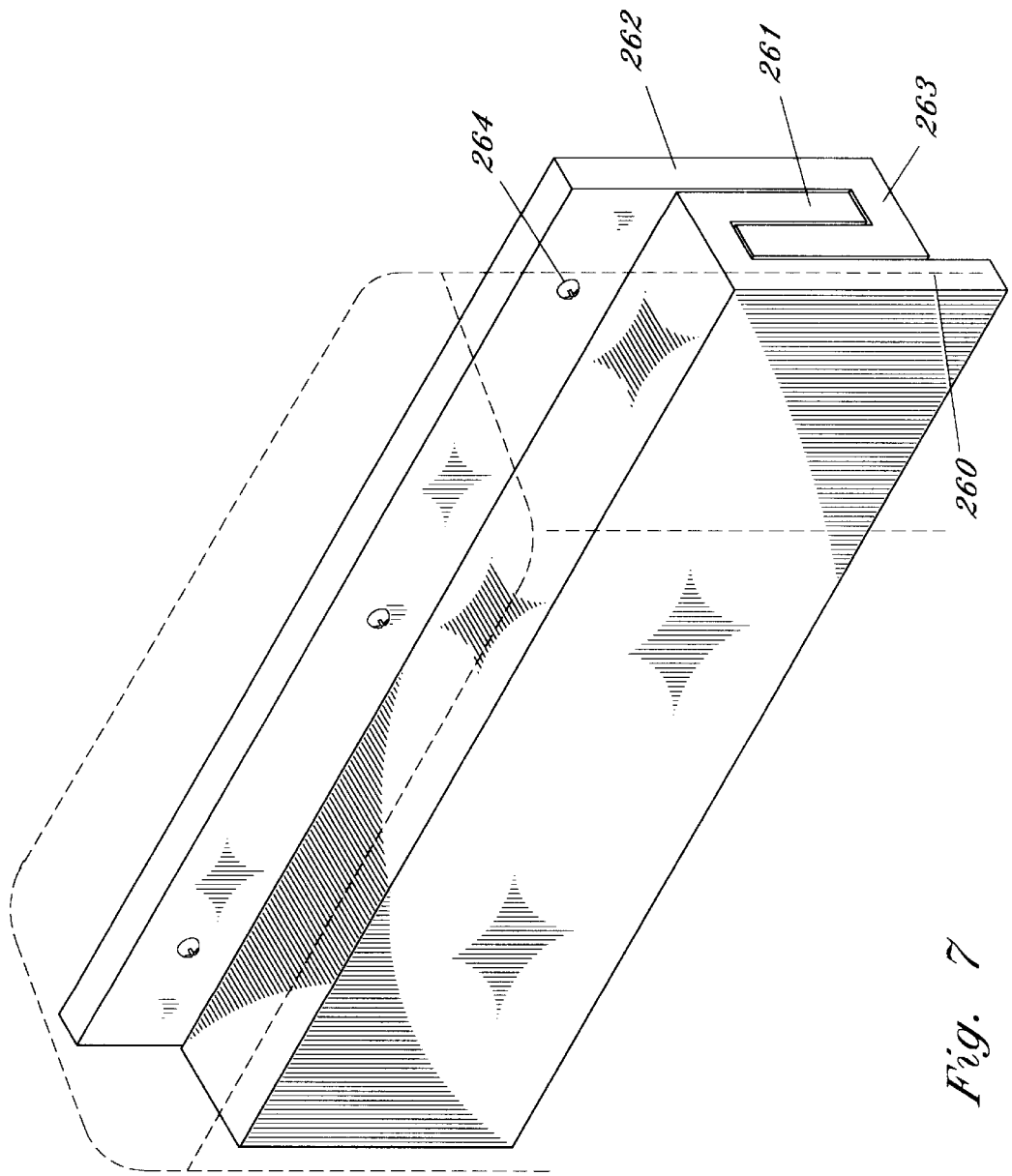
FIG. 7 is a perspective view illustrating the tank mounting means and showing a portion of the tank in phantom.

Tank hanging means 250 may be provided for securely mounting tank 10 to a wall area 200 of a dwelling. The preferred rectangular shape of tank 10 allows for placement of tank 10 against a flat wall. In one embodiment, hanging means 250 can consist of at least one bracket 260 having a ledge member 261 and being preferably integral with back wall 14 of tank 10, which mates with a similar configured bracket 262 having a ledge member 263 and being conventionally secured to wall 200 preferably by screws 264 (FIG. 7). In lieu of screws 264, studs, anchors, bolts, etc. may be utilized and are within the scope of the present invention. Furthermore, in lieu of brackets other conventional mounting means may be utilized and all are within the scope of the present invention.

To secure tank 10 to wall 200, ledge member 261 of bracket 260 is received by respective ledge member 263 of bracket 262 to create an interlocking mating relationship between brackets 260 and 262. By providing hanging brackets 260 and 262 with their associated screws or studs, the weight of the tank and stored water is distributed over a relatively large area for sufficient support.

In another embodiment, the tank can be utilized with a stand, thus eliminating the need for mounting tank 10 to wall 200. In either embodiment, tank 10 is preferably disposed above the highest water outlet in the dwelling and water supply line 100 to provide for a gravity fed water supply for each of the existing faucets, commodes, etc. in the dwelling and for maximum water flow.

FIGS. 8 and 9 illustrate an alternative embodiment for the water storage device of the present invention and is generally designated as reference numeral 300. In this embodiment tank body 302, lid 304, transparent member 306 and fittings 308 and 310 are similar in structure and function to tank body 12, lid 22, transparent member 150 and fittings 30 and 34. Tank body 302 is mounted to a wall member or disposed on a stand means similar to tank body 12 described above. Tank body 302 may also include an aperture and cap member (similar to aperture 40 and cap 41) for the insertion of purification tablets. In lieu of separate of/on valves, joints and/or self-tapping valves, a water flow direction control means 320 can be provided and is associated with an inlet pipe 312 and an outlet pipe 314.

Control means 320 includes a body member 322 disposed as part of normal water supply line 350. Body member includes a first open end attached to normal water line at 350a by conventional means, thus providing fluid communication between water line 350a and body member 322. Body member 322 also includes a second open end attached to normal water line at 350b by conventional means, thus providing fluid communication between body member 322 and water line 350b.

Body member 322 also includes a first flanged pipe member 326 having an open exposed end which is attached to the first end of inlet pipe 312 by conventional means. The second end of inlet pipe is attached to fitting 308 by conventional means. An inlet water control valve 326 is provided with flanged member 326 for controlling water flowing from water supply line 350a through inlet pipe 312 and into tank body 302. A second flanged pipe member 324 is also provided and has an open exposed end which is attached to the first end of outlet pipe 314 by conventional means. An outlet water control valve 330 is provided with flanged member 324 for controlling water flowing from tank body 302 through outlet pipe 314 and into water supply line 350b. A shut-off valve 332 is provided with body member 322 for controlling water normally flowing from water supply line 350a through body member 322 and into water supply line 350b. Body member 322, flanged pipe members 324 and 326, and valves 328, 330 and 332 are constructed from conventional means and in this embodiment are constructed as a one piece water flow direction control means 320.

When storage tank system 300 is not utilized (preferably in non-emergency situations), inlet valve 328 and outlet valve 330 are in their respective closed positions. Additionally, shutoff valve 332 is in its open position. Thus, as described above, fluids, such as water, flow through pipe 350a, body member 322, valve 332, and pipe 350b and bypass tank 300. When it is recommended or required to store extra water (i.e. hurricane or tornado warnings, other potential contamination of the water supply may occur, etc.), inlet valve 328 is opened by turning an associated knob and tank body 302 is filled via the pressure from water supply line 350. The pressure from water supply line 350 causes the water to travel from pipe 350a, into the first end of body member 322, through flange pipe 326 (including valve 328), inlet pipe 312 and fitting 308 and into tank body 302. While tank body 302 is being filled, outlet valve 330 remains in its closed position and shutoff valve 332 remains open. Once tank body 302 is filled, inlet valve 328 is returned to its closed position by turning its associated knob in an opposite direction, and water once again flows as described above, bypassing tank 300.

Where the water coming from water supply line 350a is not to be used, possibly due to potential contamination, the user merely closes shut-off valve 332 by turning its associated knob and opens outlet valve 330 by turning its associated knob. Inlet valve 328 remains in its closed position. Accordingly, valve 328 is only opened when filling tank body 302 and valve 330 is only opened when emptying tank body 302. When emptying tank body 302, by forces of gravity, water stored in tank body 302 is supplied from tank body 302 through fitting 310, outlet pipe 120a, and flanged pipe 324 (including valve 330), and out of the second end of body member 322 into water supply line 350b, for whatever desired use, i.e. faucets, commodes, bathtubs, showers, etc. Preferably, the water is stored within tank body 302 prior to any indication that water entering into the dwelling may be contaminated. Thus, when a contamination warning is given, the user has relatively large amount of water stored for use, that he or she knows is free from the fear of contaminations. Additionally, the stored water is directly tied into the users normal water supply line, causing minimal, if any, inconvenience to the user when utilizing the stored water.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A method for storing water received from a conventional water supply in a water storage tank, said water storage tank in fluid communication with said water supply line by a first pipe member and a second pipe member, said first pipe member attached at one end to said water supply line and at a second end to said water storage tank, said second pipe member attached at one end to said water supply line and at a second end to said storage tank, said first pipe member including a first valve member and said second pipe member including a second valve member, a third valve member being disposed as part of said water supply line in between the attachment of said first pipe member and said second pipe member to said water supply line, said method comprising the steps:

(a) closing said second valve member;
    (b) opening said third valve member; and
    (c) opening said first valve member to cause water flowing through said water supply line to enter said water storage tank through said first pipe member.

2. The method for storing water of claim 1, further comprising the step of:

(d) closing said first valve member after a desired amount of water is stored within said water storage tank.

3. The method for storing water of claim 2, further comprising the steps of when it is desired to use the water stored in said water storage tank:

(e) closing said third valve member; and
    (f) opening said second valve member to allow water stored within said water storage tank to flow through said second pipe member and into the water supply line.

4. A water storage tank for use in conjunction with a conventional water supply line for a dwelling, said tank comprising:

a body member defining a water storage area;
    a first pipe member having a first end and a second end, said first pipe member providing fluid communication between said body member and said water supply line, said first pipe member including a first valve member for controlling water entering said storage area of said body member from said water supply line;
    a second pipe member having a first end and a second end, said second pipe member providing fluid communication between said body member and said water supply line, said second pipe member including a second valve member for controlling water entering said water supply line from said storage area of said body member;
    a third valve member disposed as part of said water supply line in between said first pipe member and said second pipe member, said valve member controlling water flowing through said water supply line;
    wherein said second valve member is in a closed position and said first valve member and said third valve member are in open positions when filling said water storage area with water received from said water supply line through said first pipe member.

5. The water storage tank of claim 4 wherein said first valve member is in a closed position after a desired amount of water from said water supply line is stored with said storage area.

6. The water storage tank of claim 5 wherein said first valve member and said third valve member are in closed positions and said second valve member is in an open position when providing water from said storage area through said second pipe member and into said water supply line.

7. The water storage tank of claim 4 further including means for determining the amount of water stored within said storage area.

8. The water storage tank of claim 7 wherein said means for determining a transparent member disposed within said body member.

9. The water storage tank of claim 4 further including means for mounting said body member to a wall surface area of the dwelling.

10. The water storage tank of claim 9 wherein said means for mounting is a first bracket member constructed integral with said body member and a second bracket member attached to the wall surface, wherein said first bracket member and said second bracket member are interlocked when mounting said body member to the wall surface.

11. The water storage tank of claim 4 wherein said body member is disposed higher than said water supply line.

12. The storage tank of claim 4 wherein said body member having an aperture for the insertion of water purification tablets.

13. A water storage tank for use in conjunction with a conventional water supply line for a dwelling, said tank comprising:

a body member having an inlet opening and an outlet opening, said body member defining a water storage area;

a first pipe member having a first end and a second end and being in fluid communication with said water storage area of said body member;

means for connecting the first end of said first pipe member to the inlet opening of said body member;

a first valve member having a first end and a second end, the second end of said first pipe member connected to the first end of said first valve member;

a second pipe member having a first end and a second end, the first end of said second pipe member connected to the second end of said first valve member, said second pipe member being in fluid communication with said water supply line;

means for connecting the second end of said second pipe member to said water supply line;

a third pipe member having a first end and a second end and being in fluid communication with said water storage area of said body member;

means for connecting the first end of said third pipe member to the outlet opening of said body member;

a second valve member having a first end and a second end, the second end of said third pipe member connected to the first end of said second valve member;

a fourth pipe member having a first end and a second end, the first end of said fourth pipe member connected to the second end of said second valve member, said fourth pipe member being in fluid communication with said water supply line;

means for connecting the second end of said fourth pipe member to said water supply line;

a third valve member having a first end and a second end, said third valve member disposed as part of said water supply line between said means for connecting the second of said second pipe member and said means for connecting the second of said fourth pipe member;

wherein said second valve member is in a closed position and said first valve member and said third valve member are in open positions when filling said water storage area with water received from said water supply line through said second pipe member, said first valve member and said first pipe member;

wherein said first valve member is in a closed position after a desired amount of water from said water supply line is stored with said storage area;

wherein said first valve member and said third valve member are in closed positions and said second valve member is in an open position when providing water from said storage area through said third pipe member, said second valve member and said fourth pipe member and into said water supply line.

14. The water storage tank of claim 13 further including means for determining the amount of water stored within said storage area.

15. The water storage tank of claim 14 wherein said means for determining a transparent member disposed within a front surface of said body member.

16. The water storage tank of claim 13 further including means for mounting said body member to a wall surface area of the dwelling.

17. The water storage tank of claim 16 wherein said means for mounting is a first bracket member constructed integral with said body member and a second bracket member attached to the wall surface, wherein said first bracket member and said second bracket member are interlocked when mounting said body member to the wall surface.

18. The water storage tank of claim 13 wherein said body member is disposed higher than said water supply line.

19. The storage tank of claim 13 wherein said body member having an aperture for the insertion of water purification tablets.

* * * * *